United States Patent [19]

Mallouk et al.

[11] Patent Number: 5,082,472
[45] Date of Patent: Jan. 21, 1992

[54] COMPOSITE MEMBRANE FOR FACILITATED TRANSPORT PROCESSES

[76] Inventors: Robert S. Mallouk, Box 332, R.D. #1, Chadds Ford, Pa. 19317; Phillip A. Branca, 118 Wyeth Way, Hockessin, Del. 19707; Randal L. Perry, 100 Stokes Ct., Fayetteville, N.C. 28303

[21] Appl. No.: 608,907

[22] Filed: Nov. 5, 1990

[51] Int. Cl.$^5$ .................. B01D 53/22; B01D 71/36
[52] U.S. Cl. .................................. 55/16; 55/68; 55/73; 55/158
[58] Field of Search ..................... 55/16, 68, 73, 158

[56] References Cited

U.S. PATENT DOCUMENTS

| | | | |
|---|---|---|---|
| 4,174,374 | 11/1979 | Matson | 55/16 X |
| 4,194,041 | 3/1980 | Gore et al. | 428/315 |
| 4,318,714 | 3/1982 | Kimura et al. | 55/16 |
| 4,414,693 | 11/1983 | Brody | 55/16 X |
| 4,474,858 | 10/1984 | Makino et al. | 55/158 X |
| 4,515,761 | 5/1985 | Plotzker | 55/16 X |
| 4,614,524 | 9/1986 | Kraus | 55/16 |
| 4,666,468 | 5/1987 | Wu | 55/16 |
| 4,710,205 | 12/1987 | Deetz et al. | 55/16 X |
| 4,737,166 | 4/1988 | Matson et al. | 55/16 |
| 4,741,744 | 5/1988 | Wu et al. | 55/16 |
| 4,844,719 | 7/1989 | Toyomoto et al. | 55/16 |
| 4,875,908 | 10/1989 | Kikukawa et al. | 55/16 |
| 4,902,308 | 2/1990 | Mallouk et al. | 55/16 |
| 4,909,810 | 3/1990 | Nakao et al. | 55/16 |
| 4,954,145 | 9/1990 | Thakore et al. | 55/16 |
| 4,954,388 | 9/1990 | Mallouk et al. | 428/198 |
| 4,973,434 | 11/1990 | Sirkar et al. | 55/16 X |

FOREIGN PATENT DOCUMENTS

| | | | |
|---|---|---|---|
| 0122049 | 10/1984 | European Pat. Off. | 55/158 |
| 0376638 | 7/1990 | European Pat. Off. | 55/158 |
| 52-000788 | 1/1977 | Japan | 55/16 |
| 60-217145 | 10/1985 | Japan | 55/158 |
| 61-187918 | 8/1986 | Japan | 55/16 |
| 62-192589 | 8/1987 | Japan | 55/16 |
| 62-240627 | 9/1987 | Japan . | |
| 63-99246 | 4/1988 | Japan . | |
| 1-070125 | 3/1989 | Japan | 55/16 |
| 1-236919 | 9/1989 | Japan | 55/158 |
| WO89/02447 | 3/1989 | PCT Int'l Appl. | 55/158 |

OTHER PUBLICATIONS

Chemical Engineering Progress, p. 58 (Mar. 1989) Noble, Richard et al.
Liquid Membranes, Theory and Applications, Chapter 9 (Jun. 1986), Way and Noble.

(List continued on next page.)

Primary Examiner—Robert Spitzer
Attorney, Agent, or Firm—Mortenson & Uebler

[57] ABSTRACT

A dimensionally stable, composite membrane of a microporous film in laminar contact with a continuous perfluoro ion exchange resin layer is provided. The composite membrane comprises a continuous perfluoro ion exchange polymer layer which has an original, as-prepared, length, width and thickness, the ion exchange polymer layer being in laminar attachment to a film of a microporous material, preferably porous, expanded polytetrafluoroethylene (EPTFE), the microporous film having essentially the same length and width as the as-prepared continuous perfluoro ion exchange layer. The perfluoro ion exchange layer is swollen with a hydrophilic liquid to an extent that the hydrophilic liquid exceeds 20% by weight of the swollen, continuous perfluoro ion exchange layer. The swollen ion exchange layer exhibits less than a 5% increase in either length or width from its original, as-prepared, state, but it exhibits a substantial increase in thickness over its original, as-prepared, state.

The method of use of a dimensionally stable, expanded polytetrafluoroethylene (EPTFE) and perfluoro ion exchange resin composite membrane in a facilitated transport unit operation is also provided, the composite membrane comprising a continuous perfluoro ion exchange polymer layer in laminar attachment to a film of porous EPTFE, the perfluoro ion exchange layer being swollen with a hydrophilic liquid. The method is used in the facilitated transport separation of acid gas from a hydrocarbon stream.

21 Claims, 2 Drawing Sheets

OTHER PUBLICATIONS

AICHE Journal, vol. 33, No. 3, pp. 480-487 (Mar. 1987), Way, Noble, Reed, Ginley and Jarr.
Separation Science and Technology, 23, pp. 1595-1609 (1988), Noble, Pellegrino, Grosgeat, Sperry and Way.
Gas Separation and Purification, vol. 2, pp. 120-130 (Sep. 1988), Pellegrino, Nassimbene and Noble.
Polymer Material Science Eng., vol. 59, pp. 132-138 (1988), Koval and Spontarelli.
Perfluorinated Ion Exchange Membranes (May 1972), Grot et al.
Proceedings of Biochemical Engineering VI, (1988), Dutta & Sikdar.

COMPOSITE MEMBRANE FOR FACILITATED TRANSPORT PROCESSES

BACKGROUND OF THE INVENTION

The invention relates to a membrane useful in facilitated transport processes.

The unit operation of facilitated transport, generally, involves a membrane in which a chemical species, termed a carrier, chemically complexes with another species and facilitates its transport across the membrane. Because the transport process is governed by the reaction rate for complex formation, as well as by the diffusion rate of the complex, chemical separations often can be effected with very high selectivity.

As reported in Noble, Richard, et al., "Facilitated Transport Membrane Systems", *Chemical Engineering Progress*, p. 58 (March, 1989), many chemical separation processes are based on a difference in a physical property: for example, distillation, crystallization, centrifugation, and gas absorption. These processes work well at separating and concentrating different solutes when there is a large variation in the physical property of interest and high selectivities are not required.

To overcome the limitations of these processes, a chemical agent is sometimes used. This chemical agent can selectively interact with one of the solutes in the feed mixture. The solute is then captured and concentrated. The solute-chemical agent complex is then reversed by a change in operating conditions to recover both the solute and the chemical agent.

An example of this approach is the use of amines in aqueous solution to remove acid gases ($CO_2$, for example) from natural gas streams. The amine can complex with $CO_2$ and causes a larger effective solubility of $CO_2$ in the aqueous stream than would be obtained without the amine present. The aqueous solution is then heated in a separate vessel to remove the $CO_2$ and the amine solution can be recycled.

An immiscible liquid can serve as a membrane between two liquid or gas phases. Different solutes will have different solubilities and diffusion coefficients in this liquid, and the product of these two terms is a measure of the permeability. A liquid membrane can yield selective permeabilities and, therefore, a separation. Because the diffusion coefficients in liquids are typically orders of magnitude higher than in polymers, a larger flux can be obtained.

Basic configurations of facilitated transport membranes include: (1) emulsion liquid membranes in which a bulk, continuous liquid phase serves as the membrane separating a source from emulsified liquid globules which are the receiving phase; (2) immobilized liquid membranes in which the liquid membrane phase can be supported in a porous film or dissolved in a polymer film or between permeable films; and (3) ion exchange membrane supports which are swollen by the liquid, herein referred to as the solvent. Major disadvantages of the emulsion liquid membrane systems include difficulties associated with membrane stability and process de-emulsification necessary to recover the transported species from the internal phase. Immobilized liquid membranes supported on a porous structure or dissolved in a polymer substantially eliminate these difficulties but these membranes suffer loss of the solvent or of the carrier and subsequent deactivation. Also, for liquid phase separations, it is necessary to choose both a solvent and a carrier that are immiscible or insoluble in either the feed or receiving phases. The use of ion exchange membranes as supports for immobilized liquid membranes overcomes some of the disadvantages of immobilized liquid membranes. Ion exchange membranes (IEM's) can be swollen with a relatively large quantity of liquid, usually water, which opens up the IEM polymer structure and increases the mobility of the carrier complex. Although the IEM's have great capacity for retention of hydrophilic solvents such as water, it is desirable to keep the IEM film saturated by humidifying the feed stock. More importantly, IEM's will retain the carrier by strong electrostatic forces and higher carrier loadings can be achieved and maintained. In a conventional immobilized liquid membrane, the carrier loading is determined by its solubility in the liquid phase. In an IEM, the carrier loading is determined by the ion exchange density.

Effective use of membranes for facilitated transport operations, as for other membrane separation processes, requires incorporation of a relatively large area of membrane into a compact module. The module should provide for an upstream compartment with feed and exit ports wherein the fluid mixture to be separated is introduced and can be swept across the face of the membrane such that the fluid composition at the surface of the membrane is constantly renewed. The module should also provide for a downstream compartment on the other side of the membrane, with feed and exit ports, whereby the fluid species that are preferentially transported or separated can be swept away as they arrive at the membrane surface.

The use of polymeric membranes in modules for the separation of fluid mixtures by differential permeation is well known. Devices have been made using a shell and tube construction with the polymeric membrane in hollow fiber or tubular form. Also, devices have been made from spirally wound sheets separated by meshes to provide for upstream and downstream compartments. The spirally wound sheet and mesh array is normally potted or glued at each end to seal off the module so as to create upstream and downstream compartments of the module, each side fitted with feed and exit ports. The result is that the only route of a chemical species from the upstream side to the downstream side is through the membrane.

Preparing a module from a polymer film which is highly swollen with solvent is difficult. To create a leak-free module, the edges of the spiral wound polymer film must be glued or potted in the presence of large amounts of solvent in the polymer film. In the case of a relatively inert fluoropolymer membrane, special heat treatment above the boiling point of the solvent, i.e., water, and special surface treatments may be required to get a good, leak-free bond. In the presence of a large quantity of solvent used to swell the membrane, these bonding techniques become difficult.

Preparing a module from a unswollen polymer membrane and then swelling the membrane with solvent in situ also has drawbacks. A typical membrane may swell 20–50% by volume, and special treatments have been used to achieve as much as a 200% increase in volume. This creates large dimensional changes. When the membrane is rigidly held in a module, as the swelling step is carried out the membrane changes dimensionally causing it to warp and buckle. The swelling may be great enough to produce ruptures and tears in the membrane. If the membrane does not rupture, the warps and folds produced from swelling may produce areas of reduced or blocked flow, thereby greatly reducing the membrane's ability to transport material.

Instead of glueing or potting the edges of the spirally wrapped array, an interleaving of gasketing ribbon at each edge, coupled with mechanical clamping, has been considered. However, highly swollen IEM's are extremely fragile and could be broken by the clamping forces required.

U.S. Pat. No. 4,737,166 discloses a composite immobilized liquid membrane suitable for acid gas scrubbing. The membrane is a continuous, solvent swollen polymer film on a microporous polymeric support, the solvent being selected from a class of highly polar solvents. No carrier is involved nor are ion exchange resins or fluoropolymer films discussed.

Way and Noble have reported on "Hydrogen Sulfide Facilitated Transport in Perfluorosulfonic Acid Membranes", in Chapter 9 of *Liquid Membranes, Theory and Applications*, proceedings of the 8th Rocky Mountain Regional Meeting of the American Chemical Society, June 8-12, 1986. The IEM's involved were evaluated as small, single layer sheets which could be mounted in the test apparatus after swelling. The IEM's were about 7 mils thick before swelling With solvent and were in the perfluorosulfonic acid form. Water was the solvent and ethylene diamine was the carrier. These relatively thick perfluorosulfonic acid polymer (PFSAP) membranes were deficient in that transport rates were relatively low. Module fabrication by this method is difficult. These relatively thick PFSA membranes are difficult to bond when swollen with water, and cannot be swollen significantly after module fabrication without distortion and damage to the operability of the module. Mechanical clamping of the module to effect the necessary seal is not viable because of the fragility of the swollen structure.

J. D. Way, R. D. Noble, D. L. Reed, G. M. Ginley and L. A. Jarr have reported on "Facilitated Transport of $CO_2$ in Ion Exchange Membranes" in the *AICHE Journal*, March 1987, Vol. 33, No. 3, pp. 480-487. Water was the solvent and ethylene diamine was the carrier. The perfluorosulfonic acid polymer film used was 7 mils thick.

R. D. Noble, J. J. Pellagrino, E. Grosgeat, D. Sperry and J. D. Way have reported continued studies of "$CO_2$ Separation Using Facilitated Transport Ion Exchange Membranes" in *Separation Science and Technology*, 23 (12 & 13), pp. 1595-1609, 1988. In that study, higher rates of transport were achieved with a 1 mil thick perfluorosulfonic acid polymer film compared to a 7 mil thick perfluorosulfonic acid polymer film. In both of these studies, the PFSAP film was evaluated as a small, unwound single layer mounted in the test apparatus after swelling, and module construction was not considered. Transport rates with the 7 mil thick structure were relatively slow and swelling was too great to permit module construction prior to swelling. A one mil thick PFSAP membrane is very weak mechanically when swollen with water, and will not survive module assembly or sustained operation.

J. Pellegrino, R. Nassimbene and R. D. Noble have reported on additional studies in "Facilitated Transport of $CO_2$ Through Highly Swollen Ion Exchange Membranes: the effect of hot glycerine treatment" in *Gas Separation and Purification*, Vol. 2, pp. 120-130, September 1988. In that paper, the authors describe a facilitated transport evaluation of a PFSAP film in a small, single layer unwound configuration involving water as the solvent and ethylene diamine as the carrier. The PFSAP membrane is swollen to a greater level than normally hydrated PFSAP membranes by swelling the membrane in glycerine at high temperatures prior to final immersion in water to replace the glycerine. This greater level of swelling opens up the structure so that the flux obtained is four to six times higher than previously observed for normal hydrated PFSAP membranes. A high degree of facilitation for $CO_2$ and $H_2S$ is maintained as well as a high degree of selectivity compared to non-carrier reactive gases. The 7 mil PFSAP films swelled both in thickness and in linear dimension, too much to permit swelling after module fabrication and maintain a functional module. Swollen PFSAP films are too weak to withstand clamping pressures necessary for a mechanical seal. A one mil highly swollen PFSAP film is more fragile, and increases greatly in linear dimension upon swelling, making it unsuitable for reliable module fabrication and operation.

C. A. Koval and T. Spontarelli, in *Polymer Material Science Eng.* 1988, V-59, pp. 132-138, reported on a facilitated transport technique wherein the Na+ ions in a perfluorosulfonate IEM are replaced by Ag+ ions in water swollen membranes. In that study, the flux of olefins such as 1-hexene and 1,5 hexadiene was enhanced substantially. The authors demonstrated that the reversible complex formation of olefins with aqueous Ag+ allows for the facilitated transport separation of olefins that bind strongly to Ag+ from sterically hindered and saturated hydrocarbons. However, water swollen, thin perfluoro ion exchange membranes are very weak mechanically and would be difficult to incorporate in a module and operate.

"Perfluorinated Ion Exchange Membranes" by Grot et al, presented to the Electrochemical Society, May 7-11 (1972), points out that the amount of water a membrane will absorb depends on the temperature of the water. A membrane pretreated at high temperature will continue to absorb that same amount of water at room temperature unless the effect is destroyed by drying at elevated temperatures. For example, boiling a 1200 equivalent weight sulfonic acid polymer in water causes 25% water absorption. While unreinforced membranes exhibit 14-17% linear growth, membranes in which a fabric is imbedded show linear growth as low as 3%. However, the effective cross-section is reduced to about 50%, swelling in the thickness direction is limited by the three-dimensional reinforcement, and carrier concentration and mobility would be relatively low in a facilitated transport operation. The only application mentioned in this paper was electrochemical cells.

U.S. Pat. No. 4,194,041 describes a flexible, layered composite article, which permits transfer therethrough of water vapor but not liquids, comprising a flexible layer of hydrophobic material such as EPTFE attached to a continuous hydrophilic layer such as a perfluoro ion exchange membrane. The hydrophobic layer provides poor access of hydrophilic liquids to and from the membrane surface. Drying of fluid streams was not discussed nor was the use of the composite for facilitated transport disclosed.

U.S. Pat. No. 4,604,170 discloses a composite membrane structure used for electrolysis which comprises a porous layer of fluorine containing polymer having its interior and anode-side surface being hydrophilic and having a thin ion exchange resin layer supported on the cathode-side thereof. Application of such a structure as a means of separating fluids in the absence of an electric field by differential permeation or by facilitated transport is not disclosed.

U.S. Pat. Nos. 4,666,468 and 4,741,744 describe a process for separating gases by differential permeation through a hydrated perfluorosulfonic acid polymer continuous membrane on a porous support in which the pendant ionomer moieties in said hydrated continuous membrane contain metal cations. Enhanced gas separation factors for $CO_2$, $CH_4$, $O_2$, $N_2$, and He are demonstrated with this composition. No facilitated transport mechanism is described and the use of this method and these constructions for facilitated transport are not suggested. Swelling levels, as indicated by hydration conditions, are below levels desirable for facilitated transport. No module construction is disclosed nor are composite constructions defined wherein dimensional changes on swelling are such that the membrane can be swollen after module construction.

B. K. Dutta and S. K. Sikdar have reported in *Proceedings of Biochemical Engineering VI*, Santa Barbara, CA (1988) on the "Separation of Amino Acids Using Composite Ion Exchange Membranes". In that study, the amino acids dissolved in the water, swelling the IEM, and diffused at different rates through the membrane. The authors described the casting of a 0.3–0.5 mil thick perfluorosulfonic acid polymer film on an EPTFE backing of undisclosed characteristics. The composites were tested as small single layer sheets, not modules. Facilitated transport was not described nor were treatments used that would secure the high levels of swelling desirable for facilitated transport.

Japanese Patent Applications 62-240627 and 63-99246 describe an EPTFE/perfluoro ion exchange polymer composite membrane construction for the drying of air and other fluid separations. Japanese Patent Application No. 63-16199, and its corresponding U.S. Pat. No. 4,875,908, describe and claim a membrane process for selectively separating water vapor from multiple component gaseous mixtures. The membrane preferably comprises a perfluoro ion exchange polymer laminated to a support layer such as porous EPTFE. Japanese Patent Application 63-62017 (1988), its European counterpart, EPO Application No. 89101201.5, and its corresponding U.S. Pat. No. 4,909,810, describe and claim a composite EPTFE/perfluoro ion exchange polymer membrane that is water vapor selective. A composite membrane is disclosed wherein the interior and exterior walls of the porous component of the composite are coated with a resin having high water content and containing ion exchange groups. None of these disclosures describes the use of carriers or the use of these composites for facilitated transport. No modules using multilayers are described nor are composite constructions defined to insure that dimensional changes on swelling are such that the membrane can be swollen after module construction and still achieve a high degree of swelling desirable for high facilitated transport flux rates.

U.S. Pat. No. 4,954,388 discloses a fabric reinforced composite membrane used as a thin continuous barrier in facilitated transport applications. The fabric reinforced composite membrane involves a three-layered structure in which the fabric is bonded to an EPTFE layer which, in turn, is bonded to a continuous perfluoro ion exchange polymer film. However, the fabric "shadows" and effectively reduces the area available for diffusion or transport. The fabric also blocks a free flow of the fluids over the entire surface of the membrane and precludes insuring a fresh supply of the feed mixture to the membrane surface or, if on the downstream side, an efficient sweep of the transported species away from the surface of the membrane.

The composites of the present invention can be swollen to high levels needed for facilitated transport corresponding to those achieved with unmodified perfluoro ionomer films and obviate many of the problems associated with prior membranes. These composites have improved mechanical strength characteristics over unmodified perfluoro ionomers with the result that thinner barriers and higher transport rates are attainable. Surprisingly, though swelling levels as high as that for unmodified perfluoro ionomers can be achieved, dimensional changes attendant to swelling do not preclude the construction of multilayer modules involving highly swollen membranes.

SUMMARY OF THE INVENTION

A dimensionally stable, composite membrane of a microporous film in laminar contact with a continuous perfluoro ion exchange resin layer is provided. The composite comprises a continuous perfluoro ion exchange polymer layer which has an original, as-prepared, length, width and thickness, the ion exchange polymer layer being in laminar attachment to a film of a microporous material, preferably porous, expanded polytetrafluoroethylene (EPTFE), the microporous film having essentially the same length and width as the as-prepared continuous perfluoro ion exchange layer. The perfluoro ion exchange resin layer is swollen with a hydrophilic liquid to an extent that the hydrophilic liquid exceeds 20% by weight of the swollen, continuous perfluoro ion exchange layer. The swollen ion exchange layer exhibits less than a 5% increase in either length or width from its original, as-prepared, state, but exhibits a substantial increase in thickness over its original, as-prepared state. The swollen ion exchange layer preferably exhibits substantially no change in length or width from its original, as-prepared, state, but a substantial increase in thickness. The perfluoro ion exchange layer preferably is less than 75 microns thick in its original, as-prepared, state and the film of porous EPTFE preferably has corresponding porosity of from 67–93% prior to laminar attachment to the continuous perfluoro ion exchange layer. Porosity is defined herein as 1-(S1/S2) where S1 is the specific gravity of the porous substrate and S2 is the specific gravity of the solid nonporous material from which the porous structure is made. In the case of EPTFE, the S2 for the PTFE is taken as 2.18. The preferred hydrophilic liquid is water or glycerine. The composite membrane may be such that the porous EPTFE film has a coating of perfluoro ion exchange resin on the outside surfaces thereof and contains perfluoro ion exchange resin distributed throughout the internal pores of the EPTFE, the perfluoro ion exchange resin coating at least a portion of the internal surfaces within the pores of the EPTFE film. The perfluoro ion exchange resin preferably is a perfluorosulfonic acid polymer of equivalent weight below 1000.

The polymer used to make the cation exchange polymer layer can be any of several types, provided that it must be resistant for an indefinite time to the chemical action of the chemicals present in the gas separation cell at its operating temperature. While it is possible to use a cation exchange resin free of C—F bonds, it is suitable to use a highly fluorinated polymer, in which at least 80% of the C—H bonds have been replaced with C-halogen bonds. The halogen is preferably Cl or F, and more preferably, is F. Most preferably, there are no C—H bonds in the polymer, because perhalogenated, and especially perfluorinated polymers, have the best resistance to heat and chemicals.

The cation exchange polymer may be made from fluorinated polymers with side chains containing the group —$CF_2CFR'SO_2X$, wherein R' is F, Cl, $CF_2Cl$ or a $C_1$ to $C_{10}$ perfluoroalkyl radical, and X is F or Cl, preferably F. Ordinarily, the side chains will contain —$OCF_2CF_2CF_2SO_2X$ or —$OCF_2CF_2SO_2F$ groups, preferably the latter. The perfluorinated polymers are preferred. Polymers containing the side chain where k is 0 or 1 and j is 3, 4 or 5, may be used. These are described in U.S. Pat. No. 4,329,435 (Kimoto et al., Asahi Chemical).

Polymers containing the side chain —$CF_2CF_2SO_2X$ are described in U.S. Pat. No. 3,718,627 (Grot, DuPont).

Preferred polymers contain the side chain —$(OCF_2CFY)_r$—$OCF_2CFR'SO_2X$, where X is F or $CF_3$ and R' and X are as defined above; and r is 0, 1, 2, or 3. Some of those polymers are described in U.S. Pat. No. 3,282,875 (Connolly et al., DuPont). Especially preferred are copolymers containing the side chain The cation exchange polymer may be a carboxyl polymer or polymers with a fluorinated hydrocarbon backbone chain to which are attached side chains carrying certain functional groups hydrolyzable in an alkaline medium to carboxylate groups, such as nitrile or particularly ester groups. Those polymers include, e.g., those containing the side chains, where Y is F or $CF_3$; n is 0, 1, or 2; m is 1, 2, or 3; and W is —COOR or —CN, where R is lower alkyl. Some of these polymers are described in U.S. Pat. No. 4,138,246 (England, DuPont). Among these polymers, those with n=1, m=2, and Y=$CF_3$ are preferred.

The sulfonyl polymers may be blends of sulfonyl polymers. The carboxyl polymers may be blends of carboxyl polymers. It is also possible to use a blend of sulfonyl and carboxyl polymers.

Polymerization can be carried out by the methods described in the above references. Especially useful is solution polymerization using 1,2,2-trichloro-2,11-trifluoroethane as the solvent and perfluoropropionyl peroxide as the initiator. Polymerization can also be carried out by aqueous granular polymerization.

The cation exchange copolymers used in the manufacture of the composite membrane of the present invention should be of high enough molecular weight to produce films which are self-supporting in both their melt-fabricable (precursor) form and in the hydrolyzed or ion exchange form.

In the case where the backbone is —$CF_2CF_2$— and the side chain is —O—$CF_2$—$CF(CF_3)$—O—$CF_2$—$CF_2$—$SO_3H$ or its salt, the equivalent weight should be 640–1500 (or comonomer: $CF_2=CF_2$ mole ratio 1:2–1:10.5); preferably 800–1300 (or comonomer: $CF_2=CF_2$ mole ratio 1:3.5–1:8.5); and most preferably 950–1200 (or comonomer $CF_2=CF_2$ mole ratio 1:5–1:7.5). For describing optimum polymers With different side chains, the use of equivalent weights may not be as satisfactory as the use of comonomer: $CF_2=CF_2$ ratios. Lower equivalent weights may be used when the side chain containing the sulfonate group is short.

In the case where a carboxyl comonomer is copolymerized with $CF_2=CF_2$, the comonomer: $CF_2=CF_2$ mole ratio should be 1:1 to 1:10, preferably 1:2.6 to 1:8.5, most preferably 1:3.6 to 1:7. Higher mole ratios may be used for thin carboxyl polymers with short pendant side chains containing the terminal carboxyl group.

If the comonomer: $CF_2=CF_2$ mole ratio is too low, the facilitated transport rate of the composite membrane will be undesirably low. If the comonomer: $CF_2=CF_2$ mole ratio is too high, the polymer is likely to be weak, sticky, or soluble.

Also provided is a method of use of a dimensionally stable, expanded polytetrafluoroethylene (EPTFE) and perfluoro ion exchange resin composite membrane in a facilitated transport unit operation, such as separation of acid gas from a hydrocarbon stream.

DETAILED DESCRIPTION OF THE INVENTION AND PREFERRED EMBODIMENTS WITH REFERENCE TO THE DRAWINGS

A dimensionally stable, composite membrane of a microporous film in laminar contact with a continuous perfluoro ion exchange resin layer is provided. The composite membrane comprises a continuous perfluoro ion exchange polymer layer which has an original, as-prepared, length, width and thickness, the ion exchange polymer layer being in laminar attachment to a film of a microporous material, preferably porous EPTFE, the microporous film having essentially the same length and width as the as-prepared continuous perfluoro ion exchange layer. The perfluoro ion exchange layer is swollen with a hydrophilic liquid to an extent that the hydrophilic liquid exceeds 20% by weight of the swollen, continuous perfluoro ion exchange layer. The swollen ion exchange layer exhibits less than a 5% increase in either length or width from its original, as-prepared, state, but it exhibits a substantial increase in thickness over its original, as-prepared, state.

The method of use of a dimensionally stable, expanded polytetrafluoroethylene (EPTFE) and perfluoro ion exchange resin composite membrane in a facilitated transport unit operation is also provided, the composite membrane comprising a continuous perfluoro ion exchange polymer layer in laminar attachment to a film of porous EPTFE, the perfluoro ion exchange layer being swollen with a hydrophilic liquid. The method is used in the facilitated transport separation of acid gas from a hydrocarbon stream.

More specifically, a mechanically strong composite membrane is provided for use in facilitated transport processes. The membrane comprises a thin, continuous perfluoro ionomer layer attached to a porous EPTFE substrate, wherein the thin, continuous perfluoro ionomer layer is highly swollen with solvent, as is necessary for good carrier complex mobility and efficient transport rates. The composite retains both the strength and dimensional stability required to be operated in a multilayer module. The pores of the EPTFE may be unfilled, partially filled or completely filled with perfluoro ion exchange resin.

The preferred structure according to the invention is one in which the continuous perfluoro ion exchange layer is thin (e.g., 2 mils or less), the EPTFE is thin (e.g., 2 mils or less) and strong (stress at 10% elongation, by ASTM D882, exceeding 0.25 lbs/in of width), and porous, and the exterior and interior surfaces of the EPTFE are coated with a perfluoro ion exchange resin of equivalent weight less than 1000.

The perfluoro ionomer components of the composites of this invention may change in thickness or other dimensions, depending on degree of swelling with water or other solvent. As used in this application, unless otherwise denoted, thickness and other dimensional specifications are given for the perfluoro ionomer layer in its "original, as-prepared, state". The term "original, as-prepared, state" in this application refers to the condition and dimensions of the perfluoro ionomer film or perfluoro ionomer component of the composite after the extrusion, lamination and hydrolysis steps and after coming to equilibrium at 23° C. in normal room air.

Figure 1:
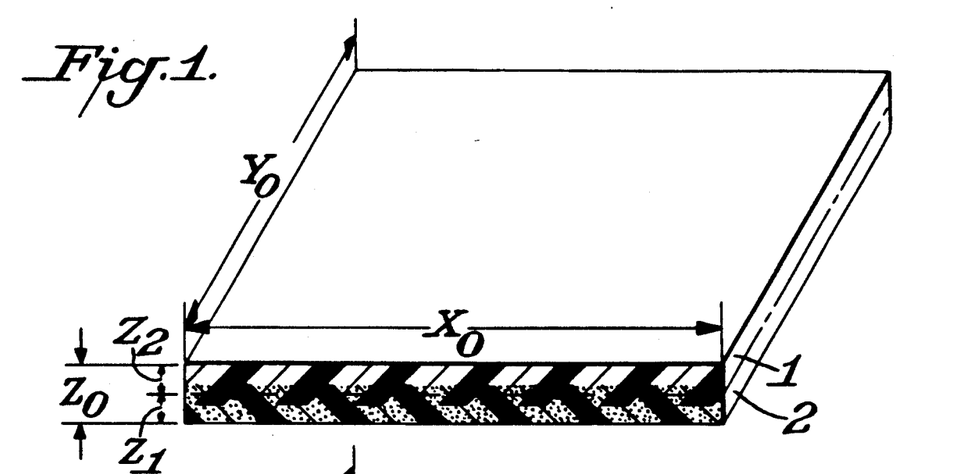
FIG. 1 is a schematic perspective view, partly in cross-section, of the precursor of the swollen composite membrane according to the invention.

A detailed description of the composite membranes of the invention and preferred embodiments are best provided with reference to the accompanying drawings wherein FIG. 1 is a schematic perspective view, partly in cross-section, of one embodiment of the composite of the invention. The composite comprises a continuous perfluoro ion exchange layer 1 bonded to a porous EPTFE film 2. The continuous ion exchange layer 1 provides: (a) a barrier to fluids except for those to be selectively transported; (b) a matrix which can be highly swollen with solvent; and (c) a matrix which, by virtue of the ion exchange sites, will retain the carrier such that it will not be swept away with the transported species. The continuous ion exchange layer in the composite should be as thin as possible, consistent with maintaining pinhole-free integrity, preferably 1 mil thick or less in the original, as-prepared, state. Thinness is important for both high transport rates and also so that the absolute amount of increase in thickness upon swelling is minimal and will not preclude multilayer module construction which is necessary for effective use of the facilitated transport phenomena.

A one mil perfluoro ionomer film is too weak mechanically for most practical uses. A film 8 mils thick in its original, as-prepared state is quite weak and subject to tear and rupture when highly swollen with glycerine or water. Glycerine treatment at 225° C. prior to immersion in water has been shown by others to be extremely effective in increasing water swelling from 15–25%, normally achieved, to over 100% based on dry polymer weight. Studies have shown this swelling increases carrier complex mobility so that transport rates have been observed that were four to six times that observed in perfluoro ionomers "normally" swollen without hot glycerine pretreatment. An 8 mil thick film is quite fragile in this highly swollen treatment and by 50% in both length and width. Such dimensional changes, coupled with its fragility, make the practical use of a highly swollen, unreinforced perfluoro ionomer film doubtful.

The thin EPTFE component of the composites of this invention imparts mechanical strength and dimensional stability to the structure without substantially blocking the flow of fluids therethrough. The spaces between the nodes and fibrils of the EPTFE provide avenues of passage for fluids to or from the continuous membrane surface. Accordingly, the pores are preferably essentially unfilled. As used herein, the term "pore diameter" means the maximum pore size as determined by ASTM F316. The composites of this invention are relatively strong and permit the reliable use of highly swollen perfluoro ionomer film components 2 mils thick or less. The composites are dimensionally stable, undergoing less than 10% change in length and width dimensions on glycerine swelling and less than 2% after final replacement of the glycerine with water. Essentially, and surprisingly, nearly all the swelling takes place in the thickness dimension but, because the continuous perfluoro ionomer membrane is so thin, the absolute amount of the dimensional change is only 2 or 3 mils per layer. Surprisingly, and paradoxically, the percent swelling of the perfluoro ionomer in the composite is about the same as for the 8 mils thick perfluoro ionomer film and is achieved without the large dimensional changes that make the use of multilayer modular construction difficult, if not impossible. A key is that essentially all the swelling is constrained so that it takes place in the thickness direction. Because the composites of this invention enable the use of thin perfluoro ionomer components, the absolute dimensional changes remain small even though a large percentage thickness and volume expansion in this IEM layer is achieved. Thus, the composites of this invention enable the use of thin, highly swollen perfluoro ionomer membranes capable of high transport rates and with strength and dimensional stability suitable for multilayer module construction and operation.

Figure 2:
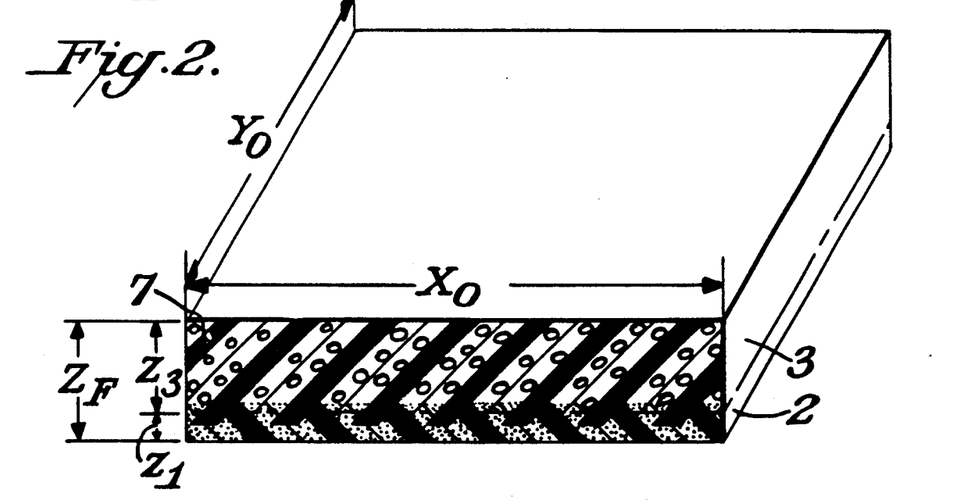
FIG. 2 is a schematic perspective view, partly in cross-section, of the swollen composite membrane according to the invention.

FIG. 2 schematically illustrates the composite of the invention in a highly swollen state wherein the thickness $Z_3$ of the swollen perfluoro ionomer film 3 increases by as much as a factor of 3 over its thickness $Z_2$ in its original, as-prepared, state, which is represented in FIG. 1. Length $Y_o$ and width $X_o$ dimensions of perfluoro ionomer film 3 and the length $Y_o$, width $X_o$ and thickness $Z_1$ of the EPTFE component 2 remain relatively unchanged.

The perfluoro ion exchange resin coating on the internal and external surfaces of the EPTFE in the preferred configuration renders the EPTFE sufficiently hydrophilic so that water, methanol and glycerine and other hydrophilic materials can escape from the interior of the composite without causing blisters during the hot glycerine treatment and subsequent cooling, or during other thermal processing (e.g., swelling by boiling in water or heating in other polar solvents).

Figure 3:
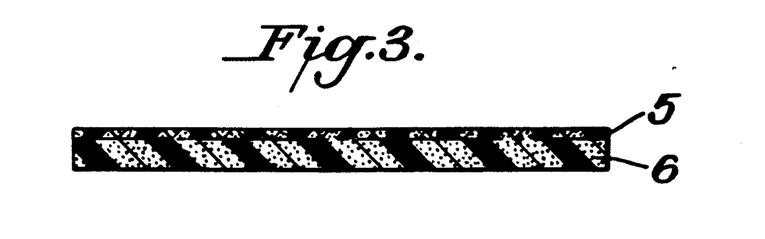
FIG. 3 is a schematic perspective view, partly in cross-section, of the composite of the invention wherein the perfluoro ion exchange resin completely fills the pores within the porous film of EPTFE.

In another embodiment according to the invention, shown in FIG. 3, a composite membrane is provided comprising an EPTFE layer 6 that is completely impregnated with perfluoro ion exchange resin and a very thin surface layer of perfluoro ion exchange resin 5.

In FIGS. 1-3, $Z_o$ denotes the overall thickness of the precursor to the composite membrane of the invention and $Z_F$ denotes the overall thickness of the swollen composite. In these figures, $$Z_F = Z_1 + Z_3 > Z_o$$

and $$Z_3 > Z_2$$

These relationships hold true for all composite membranes according to the invention.

A process for the manufacture of the composite membrane of the invention involves a series of steps. They include:

(1) Melt extrusion of the precursor of the perfluorinated ionomer to form a film. This precursor polymer may be the sulfonyl fluoride copolymer or the carboxyester copolymer. Both materials may be coextruded to form a bilayer film containing a layer of each polymer. Alternatively, a blended polymer can be used.

(2) Lamination of the precursor film to a film of EPTFE to form a precursor laminate, depicted in FIG. 1.

(3) Impregnation of the EPTFE component of the precursor laminate with a dilute (e.g., 2%) liquid composition of low equivalent weight ionomer (as disclosed in U.S. Pat. No. 4,453,991), followed by drying.

(4) Hydrolysis of the precursor film layer to the perfluoro ionomer form in an alkaline water polar organic solvent mixture, and then rinsing with water. At this stage, the composite may be dried if it is to be incorporated in a module before swelling.

Each step of the above process can be performed separately, on separate pieces of continuously operating equipment, including a roll wind-up. However, to prepare a composite having a very thin continuous ionomeric film layer, and to achieve improved economics at high production levels, steps (1) and (2) may be combined. The film prepared in step (1) can be melt coated with the precursor polymer to lay down a sub-mil thickness of the continuous film layer. Step (3) could be integrated with step (2) by spraying or otherwise impregnating the layer laminate as it comes off the laminator (or melt coater) and drying before wind-up.

Alternatively, the continuous perfluoro ionomer acid polymer membrane can be applied to the EPTFE membrane by coating the EPTFE membrane with a liquid composition of 1100 EW perfluorosulfonic acid polymer in a solvent system that forms a thin, even layer of liquid on the EPTFE surface, but does not substantially penetrate into the EPTFE structure. This step replaces steps (1) and (2) above and eliminates the need for step (4).

The precursor polymer is extruded at a temperature less than 300° C. to form a film of 0.5 to 3 mils in thickness. This film can be of sulfonyl fluoride polymer, carboxylester polymer, or a multilayered structure of sulfonyl fluoride polymers, carboxylester polymers, or both, in which the different polymers form distinct layers in the coextruded film. Alternatively, a multilayer film can be made by extruding separate films and "blocking" the films together, i.e., putting the films together under low pressure and heat so that they adhere together through a lamination process.

Lamination of the perfluoro ionomeric film to the EPTFE takes place with surface temperatures (two surfaces) less than 280° C. and under a pressure differential of not more than 760 mm mercury, with the preferred method being to apply a vacuum of no greater than 500 mm mercury to the EPTFE side of the composite, while keeping the film side at atmospheric pressure. The contact time to heat and vacuum should be less than 90 seconds.

The EPTFE side of the composite preferably should be coated with a liquid composition of ionomer prior to hydrolysis in a primarily aqueous media. Otherwise, the ionomer film will swell, and the hydrophobic EPTFE will not allow the release of the hydrostatic pressure from the swelling, causing the structure to delaminate locally.

A liquid composition of 1-6% solids 920EW equivalent weight perfluorosulfonic acid in water mixed with sufficient polar organic solvent to wet and completely penetrate the EPTFE is prepared. This liquid composition is then sprayed or coated onto the EPTFE side of the laminate in an amount sufficient to completely impregnate the EPTFE with the liquid composition. The EPTFE becomes translucent and nearly transparent upon complete impregnation. The laminate is then dried at less than the boiling point of the solvent in the liquid composition.

The composite thus formed is hydrolyzed to the ionomeric form as described in U.S. Pat. No. 4,584,071, e.g., 50°-100° C. solution of 6-20% KOH (preferred) or other soluble hydroxide, 5-40% polar organic solvent (DMSO, preferred) and 50-90% water, with a contact time of at least 5 minutes. The composite sheet is next rinsed with water for at least 10 minutes resulting in the potassium salt form of the perfluorosulfonate polymer. If desired, the polymer can be exchanged to the desired ionic form by contacting a bath of at least 1% of a salt of the desired cation, or an acid if the hydrogen form is desired, rinsed again with water, and dried.

Also if desired, the dry laminate can be impregnated by spraying, immersion or coating with a solution (0.2-5%) of an ionic surfactant in water or a salt/water solution, and dried.

Alternatively, hydrolysis can be carried out prior to coating the EPTFE side of the composite with ionomer if the water content of the hydrolysis bath is low enough so that the bath solution will fully penetrate the EPTFE, thus preventing delamination from occurring. This would involve hydrolyzing the structure immediately after lamination of the polymer film in a solution of 5-20% alkali metal hydroxide, 30-90% polar organic solvent and 0-60% water, the solution being such that it will enter into the EPTFE portion of the composite to completely fill the porous structure, at 50°-100° C., with a contact time of at least 5 minutes. The structure is rinsed in water and dried. The aforementioned 1-6% liquid composition of 920 EW acid form of the perfluorosulfonic acid polymer in a polar organic solvent is then sprayed or coated onto the EPTFE side of the structure in the same manner as above. The surfactant, if desired, and salt, also if desired, can be applied with the polymer solution to facilitate rewetting after drying.

Since a relatively large area of selective barrier is necessary for efficient separation of any appreciable amount of fluid mixtures, the selective barrier must be rolled, folded or otherwise configured so that a relatively large area may be incorporated in a relatively compact multilayer module of more or less fixed dimensions. This may be accomplished with dry, unswollen composites of this invention in the as-prepared state and the edges glued or otherwise fixed in place, followed by swelling of the perfluorosulfonic acid polymer. This is possible with the composites of this invention because the swelling of the perfluoro ionomer component is constrained to tolerable levels. Alternatively, the composites of this invention can be swollen and then mechanically clamped in place in an appropriate array because the composites of this invention are sufficiently tough to withstand the necessary clamping pressures.

The preferred method of swelling the composites of this invention for use in facilitated transfer processes, wherein water is the solvent, is patterned on the approach taken on unreinforced perfluorosulfonic acid polymer films which was reported by Pellegrino, Nassimbene, and Noble in "Facilitated Transport of $CO_2$ in Ion Exchange Membranes", in *Gas Separation and Purification*, Vol. 2, pp. 126-130, September 1988.

Briefly the procedure involves the following steps:

1) Rewetting the EPTFE component of the composite with methanol or, if there is a PFSAP coating on the interior and exterior surfaces of the composite, with a 20% isopropanol/80% water mixture;

2) Immersion of the composite in water to replace any organic solvent in the pores of the EPTFE;

3) Exposure of the composite to an excess of 0.2 M sodium hydroxide to insure complete conversion to the Na+ form of the perfluoro ionomer;

4) Drying in a 100° C. air oven to minimize water content;

5) Exposure to 60°-65° C. methanol for 4 hours;

6) Exposure to glycerine and raising of the temperature to 225°;

7) Removal from glycerine and cooling to room temperature; and

8) Immersion in an excess of 0.2 M NaOH to flush away surface glycerine and to replace glycerine in the pores with water.

Some of these steps can be carried out before module fabrication and the remaining steps after module fabrication. In the case of steps involving composites already assembled in a module, these immersions and exposures to various liquids can be handled by pumping the appropriate fluid into both the upstream and downstream compartments of the module and placing the module in the oven at the appropriate temperature. Rinsing operations can be conducted by pumping the rinsing solution through the module compartments.

The examples which follow are intended to be illustrative of the composites according to the invention and the method of its preparation and use, but should not be construed as limiting the scope of the claims in any way.

EXAMPLE I

An expanded PTFE structure, as disclosed in U.S. Pat. No. 3,953,566, which is incorporated herein by reference, herein designated as EPTFE-1 and having the following physical characteristics, was used in preparing a composite membrane according to the invention: air flow of 10 seconds as measured by Gurley densometer (ASTM D726-58); thickness between 0.0009 and 0.001 inches; apparent density about 0.40 gms/cc and methanol bubble point of 25 psi (measured by ASTM F316-80).

A commercially available perfluorosulfonic acid polymer product from the DuPont Company, Wilmington, Delaware, was used. The product designation was Nafion ® N117, a nominally 7 mil thick, 1100 equivalent weight perfluorosulfonic acid polymer film (PFSAP). Also used was a 1080 equivalent weight film of 0.001 inch thick perfluorosulfonic acid polymer film, herein designated F1. This material was prepared by extrusion of the sulfonyl fluoride form of the polymer into a 0.001 inch thick sheet and hydrolyzing in a 14% potassium hydroxide/30% dimethyl sulfoxide solution in water for 1 hour at 80° C. These films were converted to the acid (H+) form by immersion in 10% hydrochloric acid for 30 minutes, rinsing and repeating the acid soak rinse cycle a second time.

A one-mil film of 1080 equivalent weight of the sulfonyl fluoride form of perfluorosulfonic acid polymer was laminated to the EPTFE-1 film by vacuum lamination at 240° C. The EPTFE side of the laminate was then sprayed with a liquid composition of 2%, 920-950 equivalent weight (EW) hydrolyzed perfluorosulfonic acid polymer (as disclosed in DuPont U.K. Patent 1,286,589) in a 5% water/95% ethyl alcohol mixture until the impregnated EPTFE became translucent. The composite was then dried at 25° C. for 1 hour. The entire structure was then exposed to a 14% potassium hydroxide, 30% dimethyl sulfoxide solution in water at 80° C. for 1 hour to hydrolyze the continuous membrane to the potassium salt form. Finally, the continuous membrane was converted to the free acid (H+) form by immersion twice in 10% hydrochloric acid for 30 minutes at 23° C. with an intermediate deionized water rinse. This composite is herein designated C1 and can be described as 1-1080XR/EPTFE-1$_o$Q. The $_o$Q symbol indicates the EPTFE side of the composite has been treated with a liquid composition of 920-950 eqivalent weight perfluorosulfonic acid polymer.

Squares, 8.25 cm per side, were cut from N117, F1, and composite C1 in the original, as-prepared, state and which had come to equilibrium at 23° C. in air. Thickness was measured. The specimens were immersed in 0.2 M NaOH for 60 hours to be converted to the Na+ form and to be saturated with water under those conditions. The specimens were toweled dry of surface moisture and their dimensions were remeasured. They were then heated for 1 hour at 100° C. and then immersed in refluxing methanol for 280 minutes. The films N117 and F1 increased greatly in the X-Y linear dimensions whereas the composite did not. Samples were transferred from the refluxing methanol to glycerine at 25° C. The glycerine bath was heated at a 2.5 to 3 degrees per minute rate to 225° C. at which point the heat was turned off and the samples resided in the glycerine for 16 hours during which time the temperature dropped to 25° C. The samples were removed and their dimensions remeasured. F1, the swollen 1-mil perfluorosulfonic acid polymer, was too fragile to make a meaningful measurement reading. Samples were placed in 0.2 M NaOH for 16 hours, removed, and their dimensions remeasured. The 1-mil PFSAP film F1 was too fragile to accurately measure dimensions. Results are shown in Table 1 below.

F1, the 1-mil PFSAP film, was too fragile after swelling to be handled for measuring. It was fairly fragile in the original, as-prepared, state. However, from the data obtained, it seemed to expand substantially in all dimensions as did N117, the 7.7 mil PFSAP film. The latter, though also fragile and easily torn, could be measured. It increased about 50% in dimension in both length and width and increased 17 mils in thickness during the glycerine swelling step. In contrast, C1, the 1-mil PFSAP composite with EPTFE, was essentially unchanged in linear X-Y dimensions and only increased by 2-3 mils in thickness.

EPTFE-1, whose pores were filled with water, from the wet swollen weight of C1. These values for dry and wet weights of 8.25 cm × 8.25 cm squares of EPTFE-1 are each the average of 4 determinations.

Corresponding determinations were made on the water content of N117 and C1 samples which were immersed in 0.2 M NaOH for 16 hours at room temperature but did not undergo the special glycerine thermal swelling procedure. Results of these tests are summarized in Table 3.

TABLE 1:

| Sample Code | Original As-prepared Sides (cm) | Dimensional Changes During Swelling Process Dimensions | | | | | | |
|---|---|---|---|---|---|---|---|---|
| | | After 0.2M NaOH Soak | | After glycerine Soak | | Ultimate After Final 0.2M NaOH Soak | |
| | | Th (mils) | Sides (cm) | Th (mils) | Sides (cm) | Th (mils) | Sides (cm) | Th (mils) |
| N117 | 8.25 × 8.25 | 7.7 | 8 × 8.8 | 8.1 | 14.8 × 12.8 | 25 | 12.7 × 11.1 | 12 |
| F1 | 8.25 × 8.25 | 1.2 | 9 × 8.8 | 1.4 | 14.2 × 13 | — | — | 1.9 |
| C1 | 8.25 × 8.25 | 1.7 | 8.5 × 8.6 | 1.8 | 9.2 × 8.8 | 5.0 | 8.1 × 8.1 | 4.0 |

Table 2 below shows calculations which compare the dimensional stability and the volumetric swelling achieved with N117 and C1. Calculations are based on the data shown in Table 1. The effective thickness of the EPTFE in the C1 composite was taken as 0.7 mil, which is determined by substracting the 1-mil thickness of the PFSAP film employed in the composite from the 1.7 mils original, as-prepared, thickness for C1. Accordingly, the ultimate swollen thicknesses of the PFSAP component of C1 was calculated as 3.3 mils versus 1-mil in the original, as-prepared, state.

TABLE 2:

| | Dimensional Stability and Degree of Swelling | | |
|---|---|---|---|
| | Ultimate Dimensional Changes | | Ultimate Volumetric |
| Sample | Avg. % Change Length or Width | Increase in Thickness (mils) | Swelling of PFSAP % of Original Volume |
| N117 | 44 | 4.3 | 323 |
| C1 | 2 | 2.3 | 318 |

It is seen that C1, the EPTFE composite with 1-mil PFSAP film, is more durable and much more dimensionally stable than a 7.7 mil unreinforced structure, yet can undergo the high level of swelling which is needed for facilitated transport operations. Dimensional changes are minimal and toughness adequate so that a multilayer module can be built and operated, whereas dimensional changes and relative fragility preclude such a possibility in the case of the unreinforced, much thicker PFSAP structure N117.

EXAMPLE II

To confirm the volumetric swelling calculations shown in Example I, the water content of the swollen samples was assessed by measuring the loss of weight on drying. Samples N117 and C1, which had been swollen by the 225° C. glycerine exposure, followed by immersion in 0.2 M NaOH for 16 hours in Example I, were toweled dry of surface moisture and weighed. They were then placed in a 100° C. oven for 18 more hours and reweighed to insure that a constant weight had been reached.

The swollen N117 sample lost 58% of its weight on drying.

The PFSAP component of C1 lost 53% of its weight on drying.

This calculation was made after subtracting 0.078 gms, the weight of an 8.25 cm × 8.25 cm square of EPTFE-1, from the dry weight of C1, and subtracting 0.182 gms, the weight of an 8.25 cm × 8.25 cm square of

TABLE 3:

| Sample | Swelling Treatment | % Water in PFSAP of Swollen Sample |
|---|---|---|
| N117 | Special glycerine, 225° C. | 58% |
| N117 | Normal, 23° C. | 13% |
| C1 | Special glycerine, 225° C. | 53% |
| C1 | Normal, 23° C. | 22% |

The above data confirm the much higher level of swelling, highly desirable for efficient facilitated transport, achieved by the special glycerine thermal treatment according to the invention. The data also confirm the volumetric calculations of Example I which show that the thin PFSAP component of the C1 composite achieves a high level of swelling, comparable to that for N117, with very little absolute change in dimension. This dimensional stability, not available in the unsupported N117, permits multilayer module fabrication and operation.

EXAMPLE III

Another composite, herein designated C2, was prepared from the same materials in a similar manner as C1 described in Example I except that the step of spraying the EPTFE with a liquid composition of 920–950 EW perfluorosulfonic acid polymer was omitted. C2 can be described as 1-1080XR/EPTFE-1 while C1 is described as 1-1080XR/EPTFE-1 $_o$Q. Both composites were converted to the free acid (H+) form by immersion twice in 10% hydrochloric acid for 30 minutes at 23° C. with an intermediate deionized water rinse.

Each composite was stretched on an aluminum retaining ring and clamped securely. The samples were placed in a bath of glycerine and the temperature gradually raised over a 30-minute time period to 165° C. with periodic stirring. The composites on the rings were removed from the bath and allowed to cool to room temperature. They were then immersed in cold water and washed for 3 minutes and removed and allowed to dry. Composite C1 was smooth with no blisters or concentrations of glycerine. Composite C2 was blistered badly. Under the conditions employed, excess glycerine and water in the swollen structure could not escape from the composite through the hydrophobic EPTFE side and blisters were formed. On the other hand, the EPTFE component of C1, whose internal and external surfaces had been coated with PFSAP, was sufficiently hydrophilic to be wet by the hot glycerine and excess glycerine escaped with no blister formation.

In another specimen of C2, the EPTFE was first wet with isopropanol before immersion in the glycerine. It then was exposed to the same glycerine treatment, cooling, and washing as described above. Blister formation was greatly reduced, but there were visible minor blisters, whereas none had been observed previously in several treatments of C1. The merit of the perfluoro ionomer coating on the internal and external surfaces of the EPTFE component of the composite for reducing this blistering tendency was therefore confirmed.

EXAMPLE IV

Four membrane samples were prepared for evaluation. Two samples were prepared from N117 (7.7 mils thick PFSAP membrane), herein designated N117A and N117B. The remaining two samples were the composites described in Examples I and III, i.e., C1, a composite of 1080XR-PFSAP with EPTFE-1, in which the internal and external surfaces had been coated with a liquid composition of PFSAP, and C2, a similar composite of 1080XR-PFSAP and EPTFE-1 but without the liquid composition PFSAP coating.

All four membrane samples were allowed to soak for 16 hours in 0.2 M NaOH. The N117A sample received no further treatment and remained in the 0.2 M NaOH until it was evaluated. Samples N117B, C1 and C2 were swelled by first removing them from the 0.2 M NaOH and drying at 100° C. for 1 hour, placing them in methanol and refluxing for four hours, followed by heating in glycerine to 225° C. N117B, C1 and C2 were rinsed with 0.2 M NaOH for another 16 hours, removed, blotted dry and placed in a solution of molar ethylene diamine (EDA) and 1 molar hydrochloric acid in deionized water and allowed to soak for over 24 hours. N117B, C1 and C2 remained in this 1M EDA, 1M HCl solution until ready for test.

A gas permeability cell was employed to evaluate each of these four samples for permeability to $CO_2$. The test cell consisted of two cylindrical chambers with a diameter of 6.35 cm and a volume of 120 ml. Both halves had access ports for purging and sampling. Membrane samples were placed in the cell. In the cases of the composites, the EPTFE side was placed facing the source of $CO_2$. Approximately 0.5 ml of water was added to the source side of the cell to ensure a humid atmosphere. Both the source and downstream sides of the cell were purged thoroughly with ultrapure helium to remove any residual $CO_2$. Pure $CO_2$ was added to the source side of the cell through a water bubbler, and this $CO_2$ stream was allowed to purge through the source side of the cell for the duration of each test. A gaslight syringe was used to remove 1000 microliter aliquots of gas from the downstream side of the cell at different times after the introduction of $CO_2$ to the source side of the cell.

The gas aliquots were directly injected into a gas chromograph to separate and quantify the $CO_2$ present. The $CO_2$ peak areas from these analyses were compared to peak areas derived from direct injection of various volumes of pure $CO_2$ into the gas chromograph. Data are presented for the four membrane samples as relative concentration of $CO_2$ (in percent) in the downstream cell reservoir as a function of time (in minutes) after introduction of $CO_2$.

Figure 4:
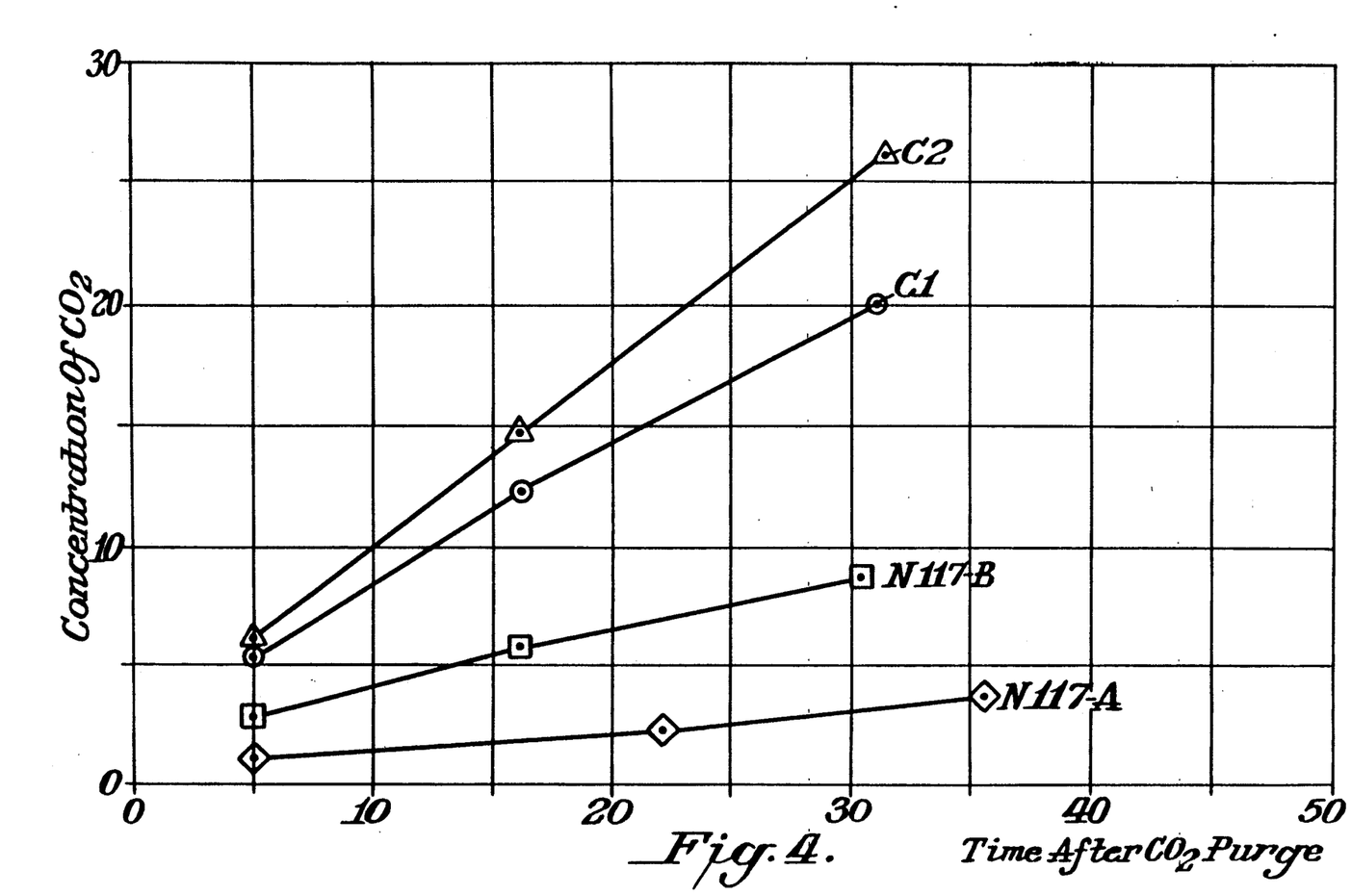
FIG. 4 is a graph depicting the enhanced facilitated transport fluxes through composite membranes according to the invention versus time after carbon dioxide purge.

FIG. 4 graphically shows the differences in the four membrane samples in terms of their ability to transport $CO_2$ from the source to the downstream side of the membrane. Sample N117A exhibited the slowest transport of $CO_2$ of the four membranes. This sample is relatively thick, it was not swelled in high temperature glycerine and was not exchanged with ethylene diamine prior to testing and so is not facilitating the transport of $CO_2$ to any substantial extent. Sample N117B was swelled in high temperature glycerine and was exchanged with ethylene diamine. It correspondingly has a much faster transport of $CO_2$ than N117A. The transport capabilities of N117B, however, were limited by the thickness of the film.

The PFSAP/EPTFE membrane samples, C1 and C2, show significant increase in $CO_2$ transport over the N117B membrane due, in part, to their much lower thickness. The difference in $CO_2$ transport between samples C1 and C2 can be explained by the low equivalent weight PFSAP treatment of the EPTFE. The added PFSAP has completly filled or bridged some of the pores in the EPTFE as well as coated the surface of the continuous membrane, effectively increasing the thickness of the entire structure. This difference between samples C1 and C2 is seen to be small in comparison to the difference between these composites and a thick, monolithic membrane.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. The method of use of a dimensionally stable, expanded polytetrafluoroethylene (EPTFE) and perfluoro ion exchange resin composite membrane in a facilitated transport unit operation, the method comprising chemically complexing a chemical species with another species and facilitating its transport across a composite membrane, said composite membrane comprising a continuous perfluoro ion exchange polymer layer in laminar attachment to a film of porous EPTFE, said perfluoro ion exchange layer being swollen with a hydrophilic liquid.

2. The method of use of claim 1 wherein said perfluoro ion exchange layer is swollen with said hydrophilic liquid to an extent that said hydrophilic liquid exceeds 20% by weight of the swollen, continuous perfluoro ion exchange layer.

3. The method of use of claim 1 in the facilitated transport separation of acid gas from a hydrocarbon stream.

4. The method of use of claim 3 in which said acid gas is carbon dioxide.

5. The method of use of claim 3 in which said acid gas is hydrogen sulfide.

6. The method of use of claim 1 in the facilitated transport separation of compounds containing unsaturated aliphatic hydrocarbon moieties from compounds which have no unsaturated aliphatic hydrocarbon moieties.

7. The method of use of claim 1 wherein the perfluoro ion exchange polymer is in the monopositive diamine form and ethylene diamine is a carrier.

8. A dimensionally stable, layered composite membrane comprising: a continuous highly-fluorinated polymeric ion exchange membrane layer in which at least 80% of the C—H bonds therein have been replaced with C-Halogen bonds, said ion exchange membrane having an original, as-prepared, length, width and thickness, said thickness being less than 75 microns (3 mils), said ion exchange polymer layer being in laminar attachment to a microporous sheet having essentially the same length and width as said as-prepared fluorinated ion exchange membrane layer, said microporous sheet having a pore diameter in the range of 0.01–100 microns, a thickness of less than 500 microns (20 mils), stress at 10% elongation (by ASTM D882) exceeding 0.25 lbs/in of width and porosity in the range of 30–95%, said ion exchange membrane layer being swollen with a hydrophilic liquid to an extent that said hydrophilic liquid exceeds 20% by weight of said swollen, ion exchange layer, said swollen ion exchange layer exhibiting less than a 5% increase in length and width from its length and width in its original, as-prepared, state, said swollen ion exchange layer exhibiting a substantially increased thickness over its original, as-prepared, state.

9. The composite membrane of claim 8 wherein said ion exchange membrane is a perfluorinated polymeric cation exchange membrane of 650–1300 equivalent weight, and said microporous sheet has a thickness less than 250 microns (10 mils).

10. The composite membrane of claim 8 wherein said ion exchange membrane is a perfluorosulfonated cation exchange polymer membrane of 650–1300 equivalent thickness less than 50 microns (2 mils), and wherein said microporous sheet is a film of porous, expanded polytetrafluoroethylene (EPTFE) having an average pore diameter in the range of 0.01–5 microns a thickness of less than 125 microns (5 mils), and porosity in the range of 60–93%.

11. The composite membrane of claim 10 wherein said ion exchange membrane is a perfluorosulfonated cation exchange polymer membrane of 900–1200 equivalent weight, and wherein said EPTFE film has a pore diameter in the range of 0.05–2 microns, a thickness of less than 75 microns (3 mils) and porosity in the range of 67–93%.

12. The composite membrane of claim 8 wherein said ion exchange layer is swollen with a hydrophilic liquid to an extent that said hydrophilic liquid exceeds 30% by weight of the swollen, continuous ion exchange layer.

13. The composite membrane of claim 8 wherein said hydrophilic liquid is water.

14. The composite membrane of claim 8 wherein said hydrophilic liquid is glycerine.

15. The composite membrane of claim 8 in which said microporous sheet has a coating of perfluoro ion exchange resin on its outside surface and on at least a portion of its internal surfaces proximate to said outside surface.

16. The composite membrane of claim 8 in which said microporous sheet has a coating of perfluoro ion exchange resin on the outside surface thereof and contains perfluoro ion exchange resin distributed throughout the pores of said microporous sheet, the perfluoro ion exchange resin coating at least a portion of the internal surfaces within the pores of said microporous sheet.

17. The composite membrane of claim 16 in which the internal and external surfaces of the microporous sheet are completely coated with the perfluoro ion exchange resin.

18. The composite membrane of claim 16 in which the pores of said microporous sheet are completely filled with perfluoro ion exchange resin.

19. The composite membrane of claim 15, 16, 17 or 18 in which the perfluoro ion exchange resin coating the surfaces of the microporous sheet is perfluorosulfonic acid polymer of equivalent weight below 1000.

20. The composite membrane of claim 8 wherein said microporous sheet is an EPTFE film and, in its original, as-prepared, state, is impregnated with a water soluble surfactant.

21. The composite membrane of claim 8 wherein said continuous ion exchange layer comprises a polymer in the monopositive diamine form and ethylene diamine is a carrier.

* * * * *